T. H. KNISELY.
MUD HOOK.
APPLICATION FILED JAN. 24, 1922.
1,413,167.
Patented Apr. 18, 1922.
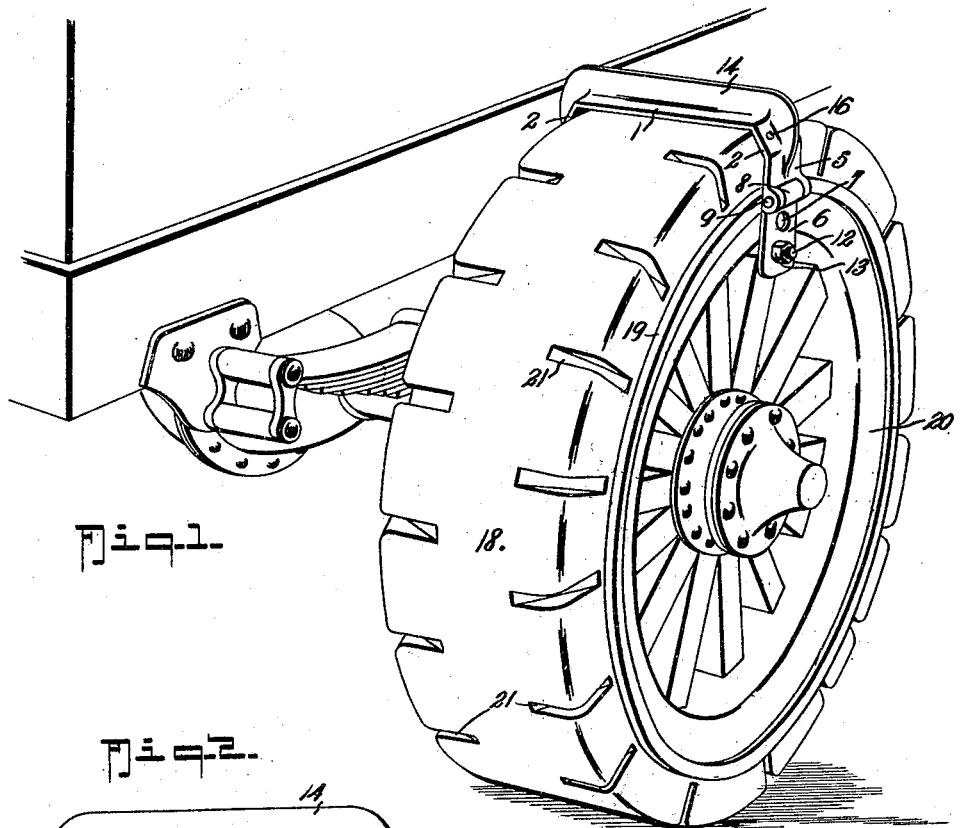
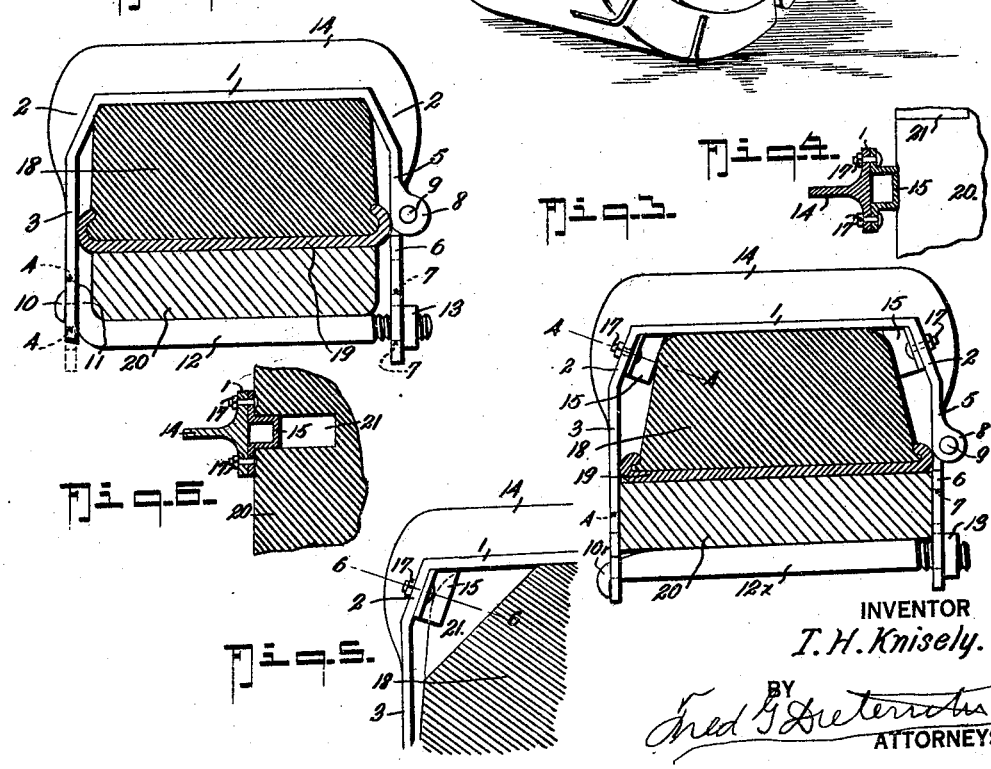
INVENTOR
T. H. Knisely.
BY
Fred G. Dieterich Co.
ATTORNEYS

UNITED STATES PATENT OFFICE.

TITUS H. KNISELY, OF RED LION, PENNSYLVANIA.

MUD HOOK.

1,413,167.　　　　　　　　Specification of Letters Patent.　　Patented Apr. 18, 1922.

Application filed January 24, 1922. Serial No. 531,372.

*To all whom it may concern:*

Be it known that I, TITUS H. KNISELY, a citizen of the United States, residing at Red Lion, in the county of York, and State of Pennsylvania, have invented certain new and useful Improvements in Mud Hooks, of which the following is a specification.

My invention relates to certain new and useful improvements in mud hooks and is especially designed for use on solid truck type tires.

The invention has for its object to provide a device of the character stated, of a simple and inexpensive construction, that can be used on different styles, sizes and widths of tires; and to provide a mud hook that can be quickly placed on or removed from the wheel, the mud hook being provided with means whereby it will not creep when in use.

In its more detailed nature, the invention also resides in those novel features of construction, combination and arrangement of parts, all of which will be first fully described, then be specifically pointed out in the appended claims, reference being had to the accompanying drawing, in which:

Figure 1 is a perspective view of the invention in use as applied to a practically new straight side truck tire.

Figure 2 is a cross section, through the tire rim and felly band, showing the parts shown in Figure 1.

Figure 3 is a view similar to Figure 2 showing the adapters or corner blocks in place to cause the device to fit on a wheel and tire of another shape and size than that shown in the preceding figures.

Figure 4 is a detail cross section on the line 4—4 of Figure 3.

Figure 5 is a detail vertical section and part elevation showing the modified way in which the adapters or corner blocks may be used.

Figure 6 is a detail section on the line 6—6 of Figure 5.

In the drawing in which like numerals of reference indicate like parts in all of the figures, the mud hook comprises a substantially U-shaped member consisting of a flat tread plate 1 from which diverge corner plates 2 that merge with parallel leg plates 3 and 5—6, the latter 5—6 being articulated for a purpose presently explained.

The plate portions 1 and 2 and the leg 3 and leg section 5 are made, of course, in one piece and formed with the plate portions 1 and 2 is a fin 14. Therefore, in cross section the plates 1 and 2 are of T shape. The leg 3 is provided with a plurality of square holes 4—4 for receiving the squared ends 10—10$^x$ of the hook bolts 12 or 12$^x$, as the case may be. The other leg consists of the rigid section 5 and the hinged plate section 6, the two being hinged together at 8 on a pin 9. The leg section 6 is provided with a plurality of round holes 7 through which the threaded end of the bolts 12 or 12$^x$ may project and be secured by the nuts 13.

The bolts 12—12$^x$ have squared heads 10—10$^x$ to fit into the holes 4 and cooperate therewith to prevent turning of the bolts on their axes. The bolt 12 has an angled portion 11 paralleling the leg 3 and adapted to lie against the rim 20 of the wheel so as to prevent undue strains on the leg 3 which might tend to bend or break it at the place where it contacts the rim 19 of the tire 18.

The corner plate sections 2—2 have bolt holes 16 in order that the adapters or corner pieces 15 may be secured by bolts and nuts 17 passing through their wings. The adapter or corner pieces 15 are designed to fit in the corners between the plate sections 1 and 2, as indicated in Figures 3 and 5 of the drawing, and are substantially U-shaped in cross section and are of a width less than the width of the plates 1 and 2.

These adapters 15 are used when the mud hook is applied to a beveled tire as shown for instance in Figure 3, or to a tire of less width than the greatest width for which the mud hook is designed. If the mud hook is to be applied to a tire of the type shown in Figure 2, that is of less width than there shown, one corner piece may be sufficient to enable the device to fit the tire. Whether or not one or both corner pieces are used will depend upon the size of the tire on which the hook is applied. It will be noted that the opposing faces of the adapters 15 also lie in planes which diverge from the plate 1 so that when the hook is applied to the tire, the adapters 15 will engage the sides with a wedging tendency so as to grip the tire and thus aid in holding the hook from creeping.

In tires of the type shown in Figure 1, the adapters 15 may be made thin enough to enter the slots 21 in the tire (see Figures 5 and 6) and thus aid in preventing creeping.

Where the width of the felly 20 of the wheel is less than the width of the rim 19, the hook 12 is employed but where the leg 3 can lie close to the felly, a hook such as the hook 12$^x$ may be used (see Figure 3).

I also desire it understood that the adapters may be made of greater or less size and several different sizes may be furnished with each mud hook so as to enable the device to be used on almost any style or shape of tire.

By providing the diverging surfaces at 2—2 when the mud hook is in contact with the ground the deformation of the rubber of the tire due to the weight of the load will tend to exert greater pressure against the plate portions 2—2 and thus increase the contact surface between the tire and the mud hook and thereby proportionately decrease any creeping tendency that might be present.

When my device is used in connection with wheels on which the brake drum is of a diameter closely approaching the felly band, it may be found necessary to cut off the lower end of the leg 3. When this is done, the hook shown in Figure 2 is employed and the leg 3 is cut off as indicated in Figure 2, the dotted lines showing the part cut off.

From the foregoing description, taken in connection with the accompanying drawing, it is thought the complete construction, operation and advantages of the invention will be clear to those skilled in the art.

What I claim is:

1. A mud hook comprising a flat top plate and two leg plates extending parallel to each other and at right angles to the top plate and connected with the top plate by diagonal corner plate portions, a fin projecting from the outer faces of said top plate and diagonal corner plate portions, one of said legs being articulated, said legs having cross bolt holes and a hook bolt with nut connecting said legs and a corner block secured to one of said diagonal corner portions and adapted to engage a tire.

2. A mud hook comprising a flat top plate and two leg plates extending parallel to each other and at right angles to the top plate and connected with the top plate by diagonal corner plate portions, a fin projecting from the outer faces of said top plate and diagonal corner plate portions, one of said legs being articulated, said legs having cross bolt holes and a hook bolt with nut connecting said legs and a corner block secured to one of said diagonal corner portions and adapted to engage a tire, the width of said corner blocks being less than the width of said top bar and diagonal corner plate portions, said corner block being adapted, when the mud hook is in place, to grip the tire adjacent to a corner thereof for the purposes specified.

3. A mud hook comprising a substantially U-shaped body, one leg of which is articulated, said body being adapted to straddle a tire and wheel rim, said legs having bolt holes, a cross bolt with nut connecting said legs and holding said body with its tread portion in engagement with the tire tread, corner blocks secured to said body and having their opposing faces inclined whereby to engage the tire with wedging action when the mud hook is in place and thereby retard creeping tendency.

4. A mud hook comprising a substantially U-shaped body, one leg of which is articulated, the articulated end of that leg having bolt holes, the other leg having bolt holes of rectangular form, cross bolts having one end provided with a hook member of rectangular form to engage the rectangular apertures of one leg and having its other end threaded to project through the apertures of the other leg and provided with a nut, said bolt having an offset portion at the hook adapted to lie between the wheel felly and the leg to which the bolt is hooked, substantially as shown and described.

TITUS H. KNISELY.